May 13, 1958     C. F. STUART     2,834,169
APPARATUS FOR DEPOSITING ARTICLES INTO RECEPTACLES
Filed May 6, 1954     9 Sheets-Sheet 1
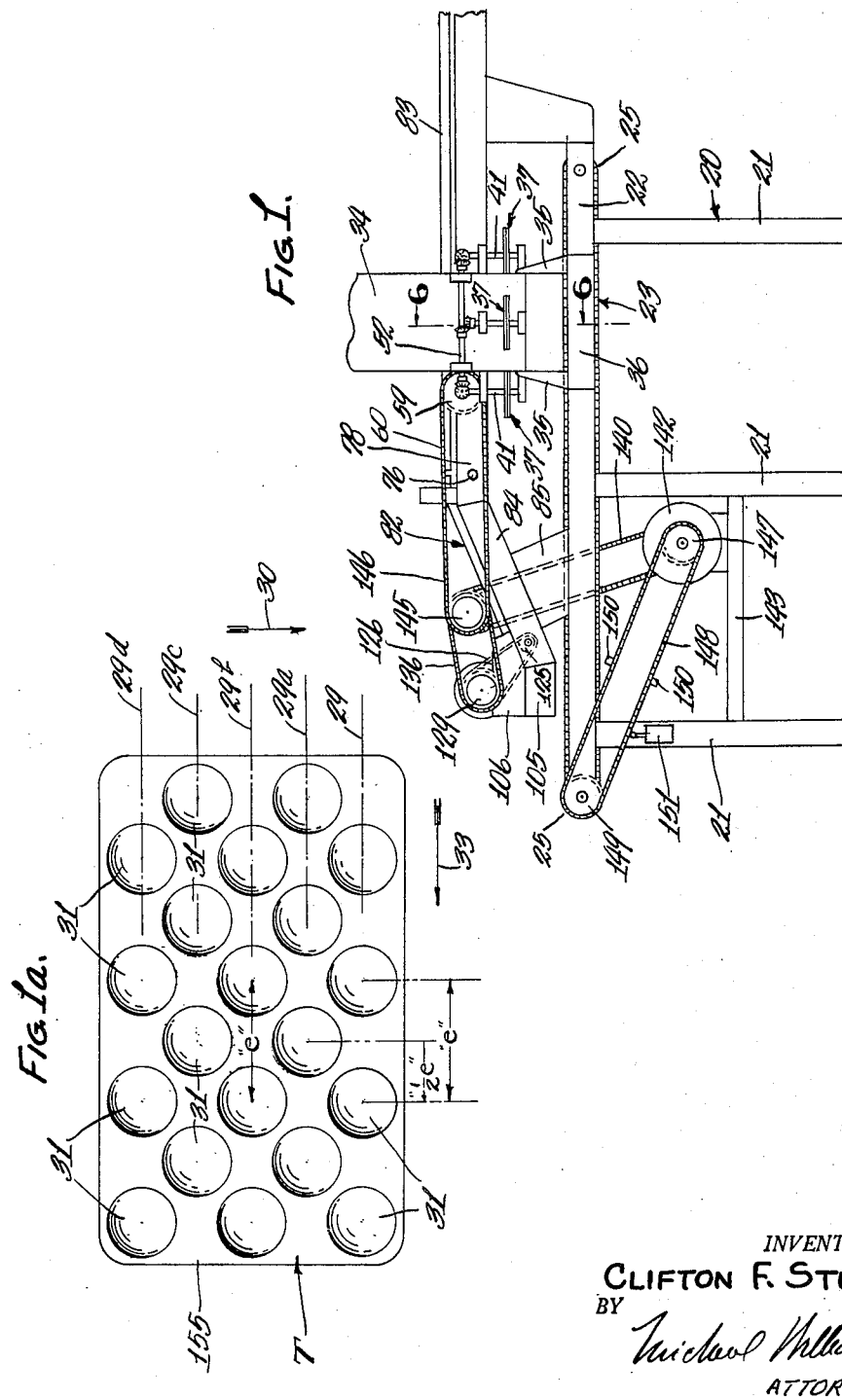
INVENTOR.
CLIFTON F. STUART
BY
ATTORNEY

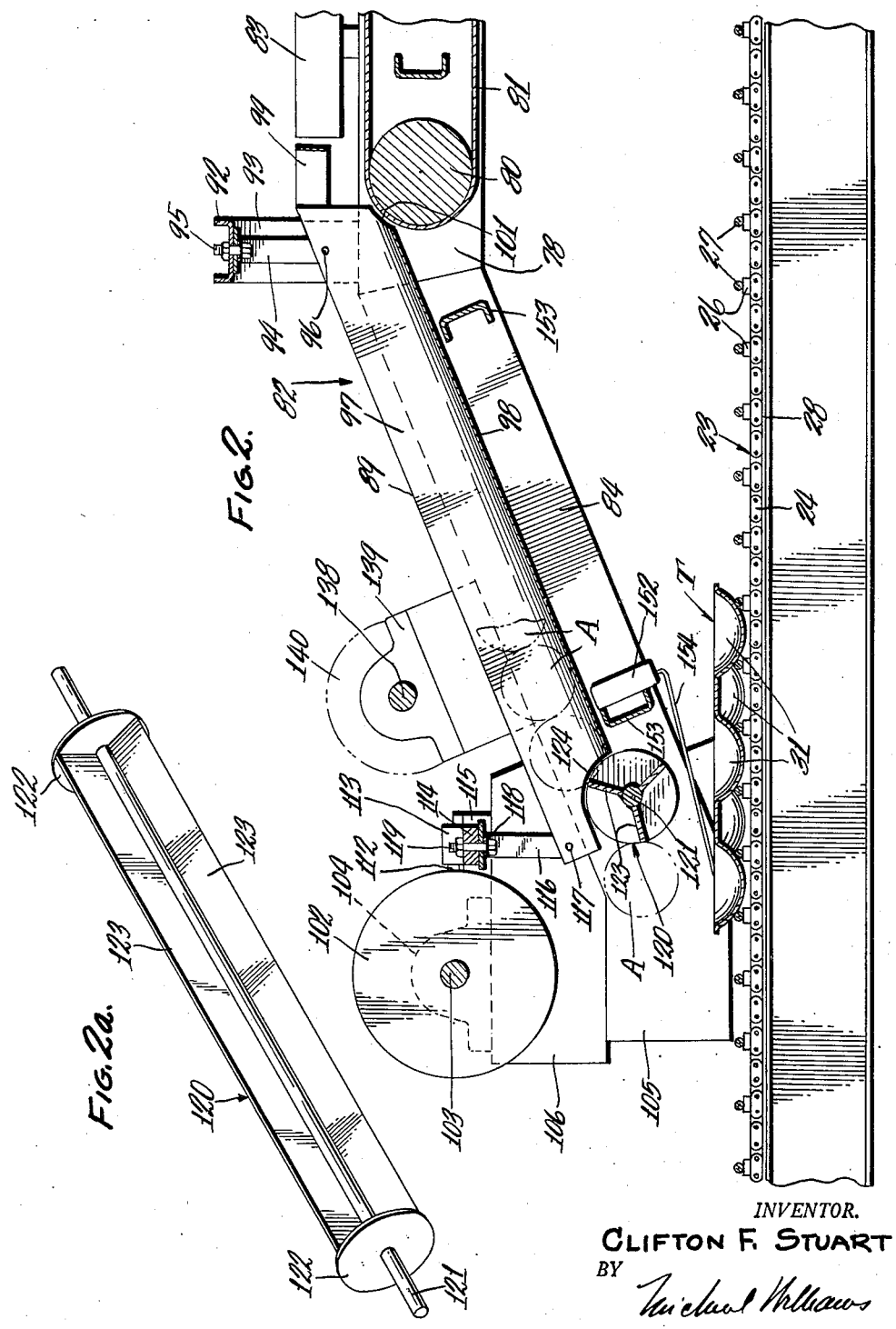

May 13, 1958 C. F. STUART 2,834,169
APPARATUS FOR DEPOSITING ARTICLES INTO RECEPTACLES
Filed May 6, 1954 9 Sheets-Sheet 3
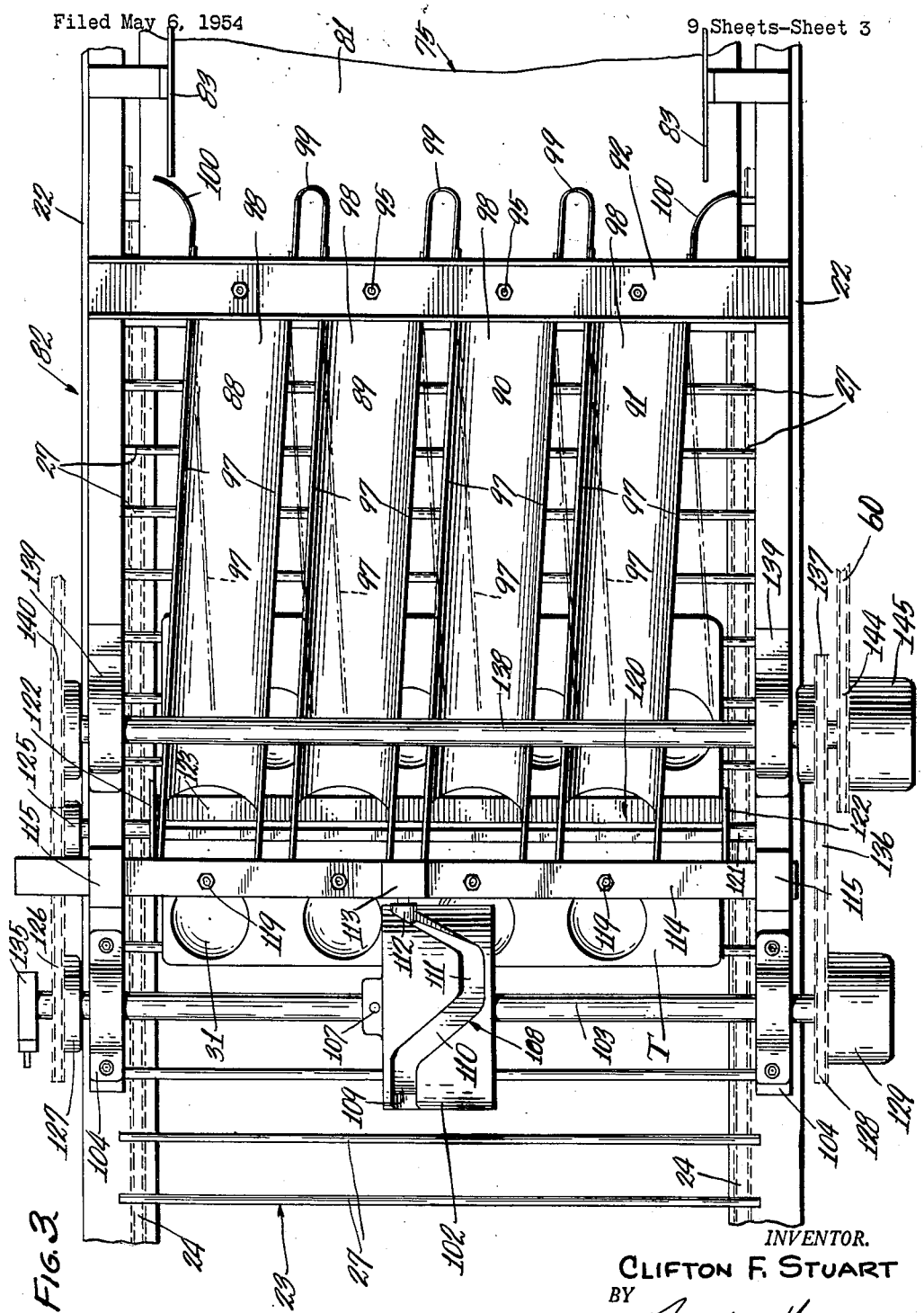
INVENTOR.
CLIFTON F. STUART
BY
ATTORNEY May 13, 1958 C. F. STUART 2,834,169
APPARATUS FOR DEPOSITING ARTICLES INTO RECEPTACLES
Filed May 6, 1954 9 Sheets-Sheet 4
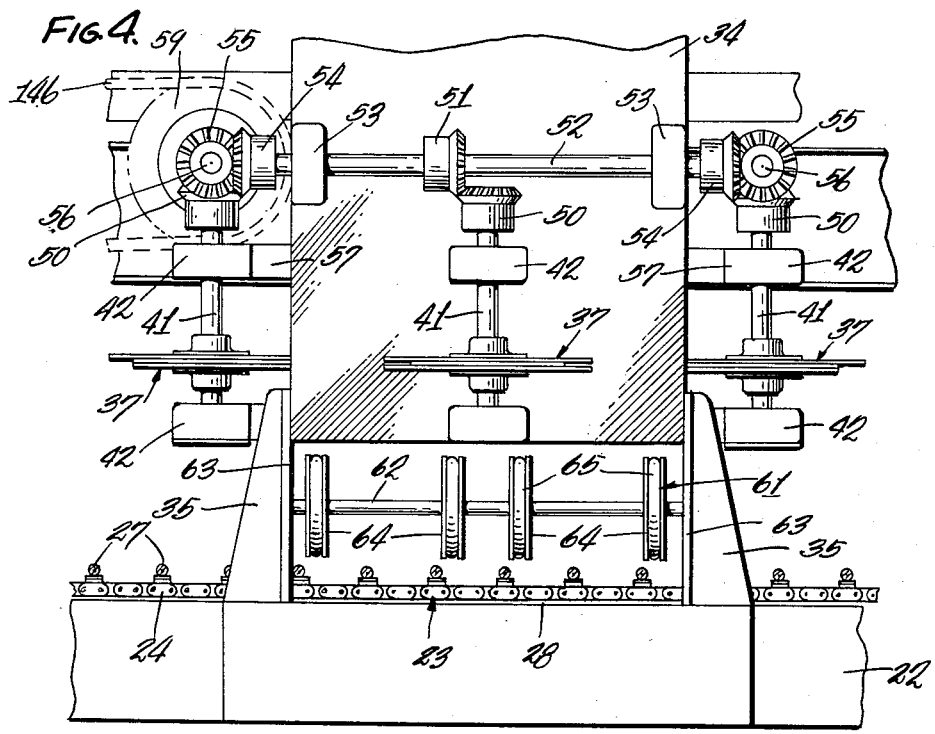
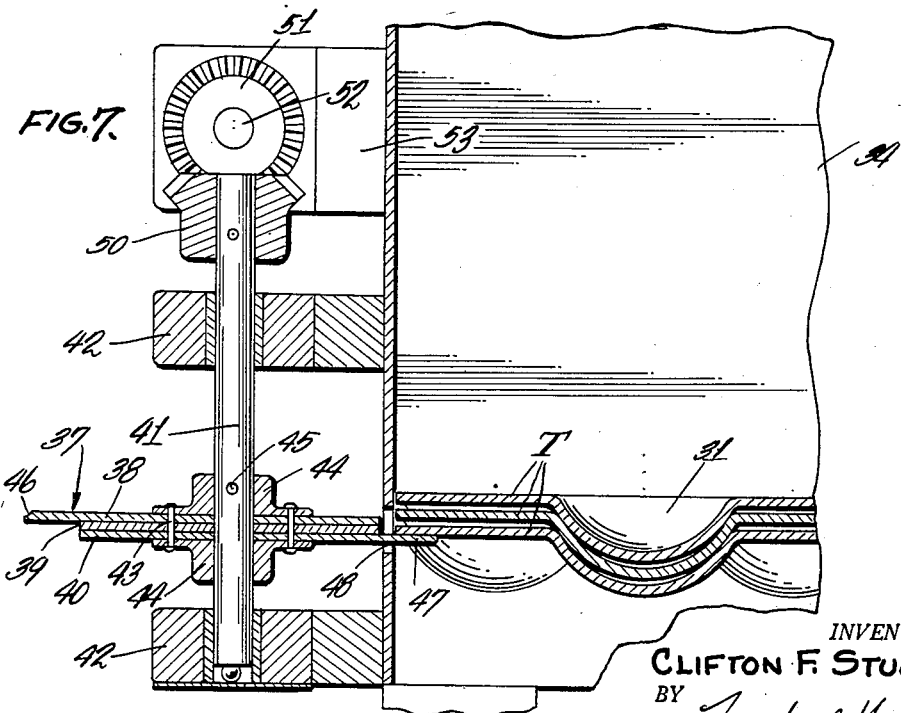
INVENTOR.
CLIFTON F. STUART
BY
ATTORNEY

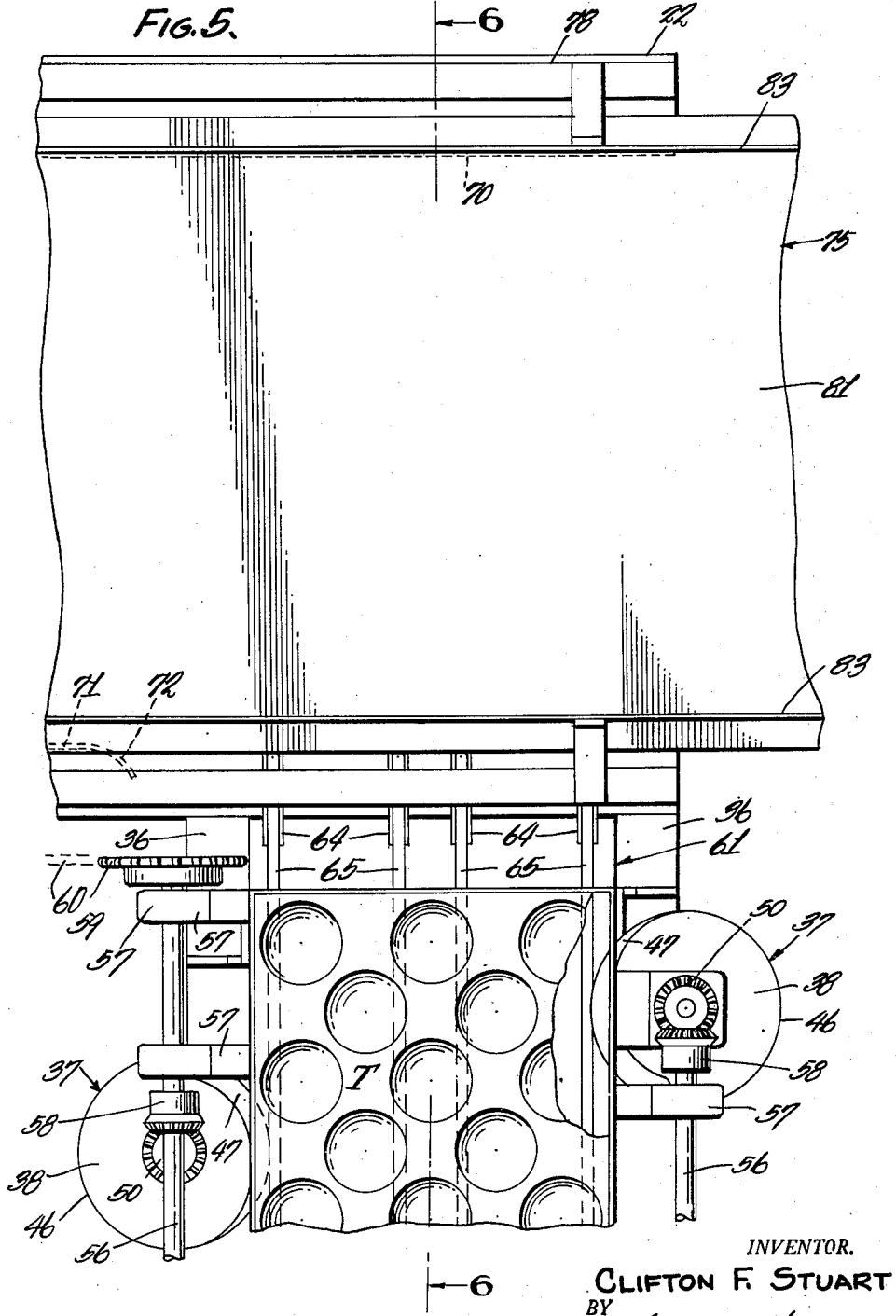

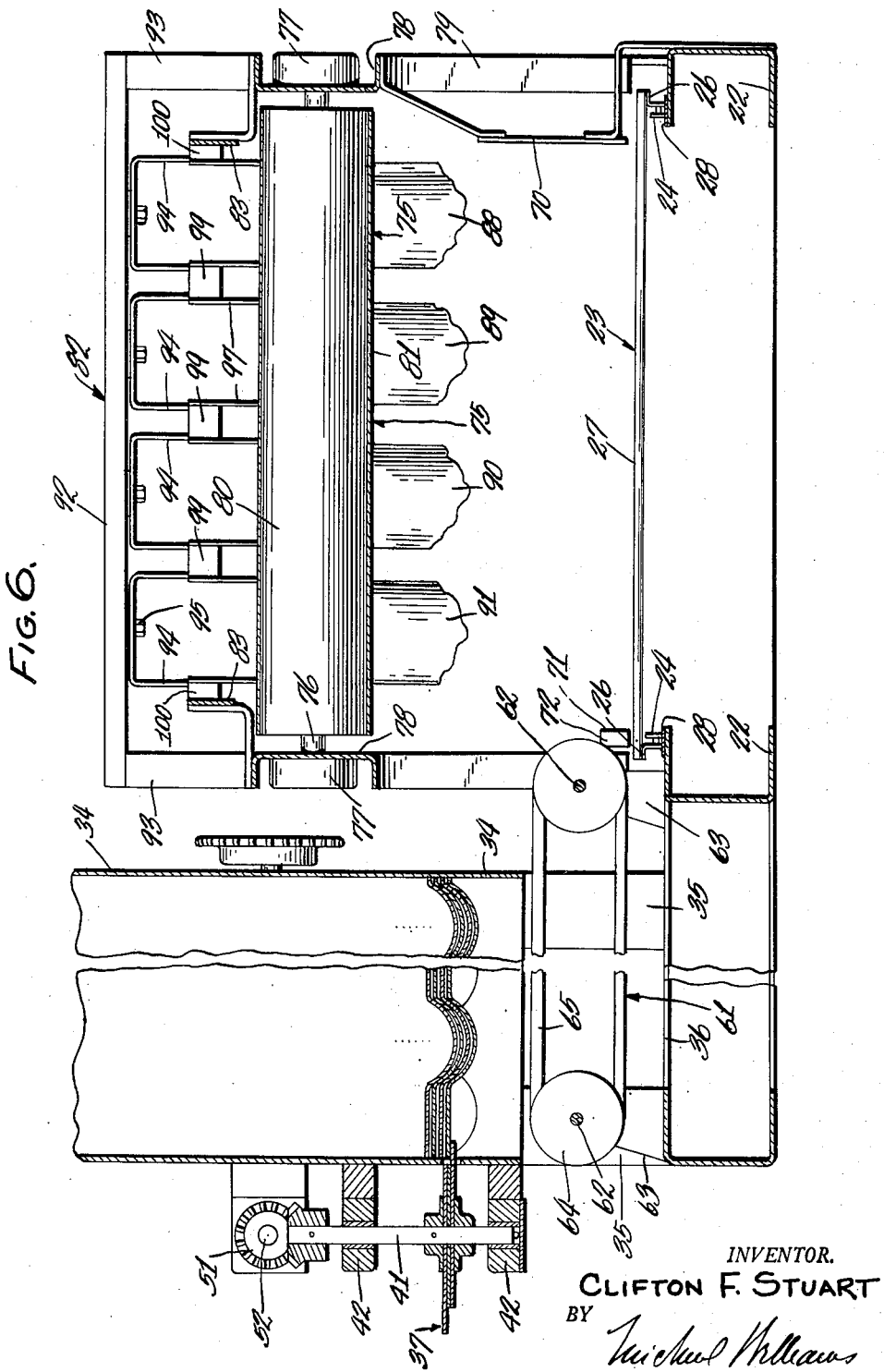

May 13, 1958 C. F. STUART 2,834,169
APPARATUS FOR DEPOSITING ARTICLES INTO RECEPTACLES
Filed May 6, 1954 9 Sheets-Sheet 7
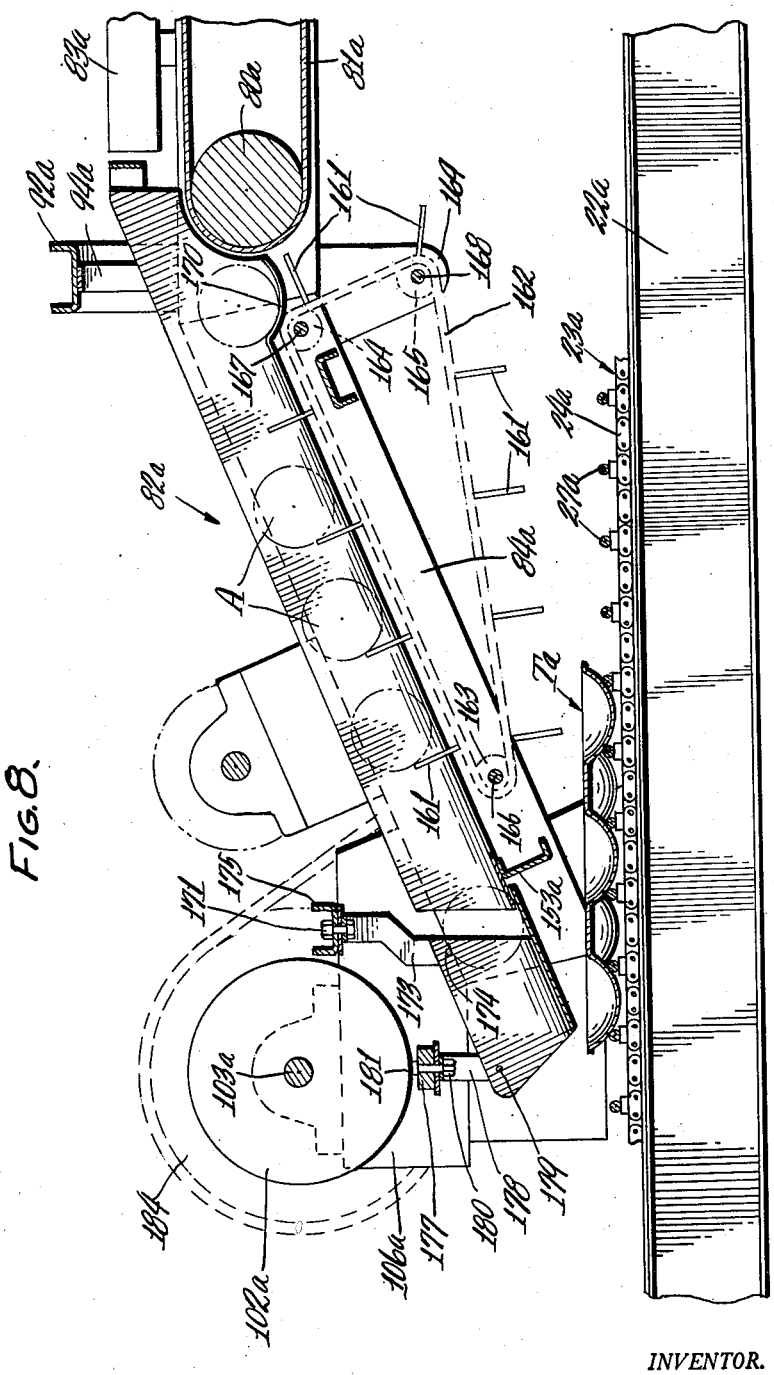
INVENTOR.
CLIFTON F. STUART
BY
ATTORNEY

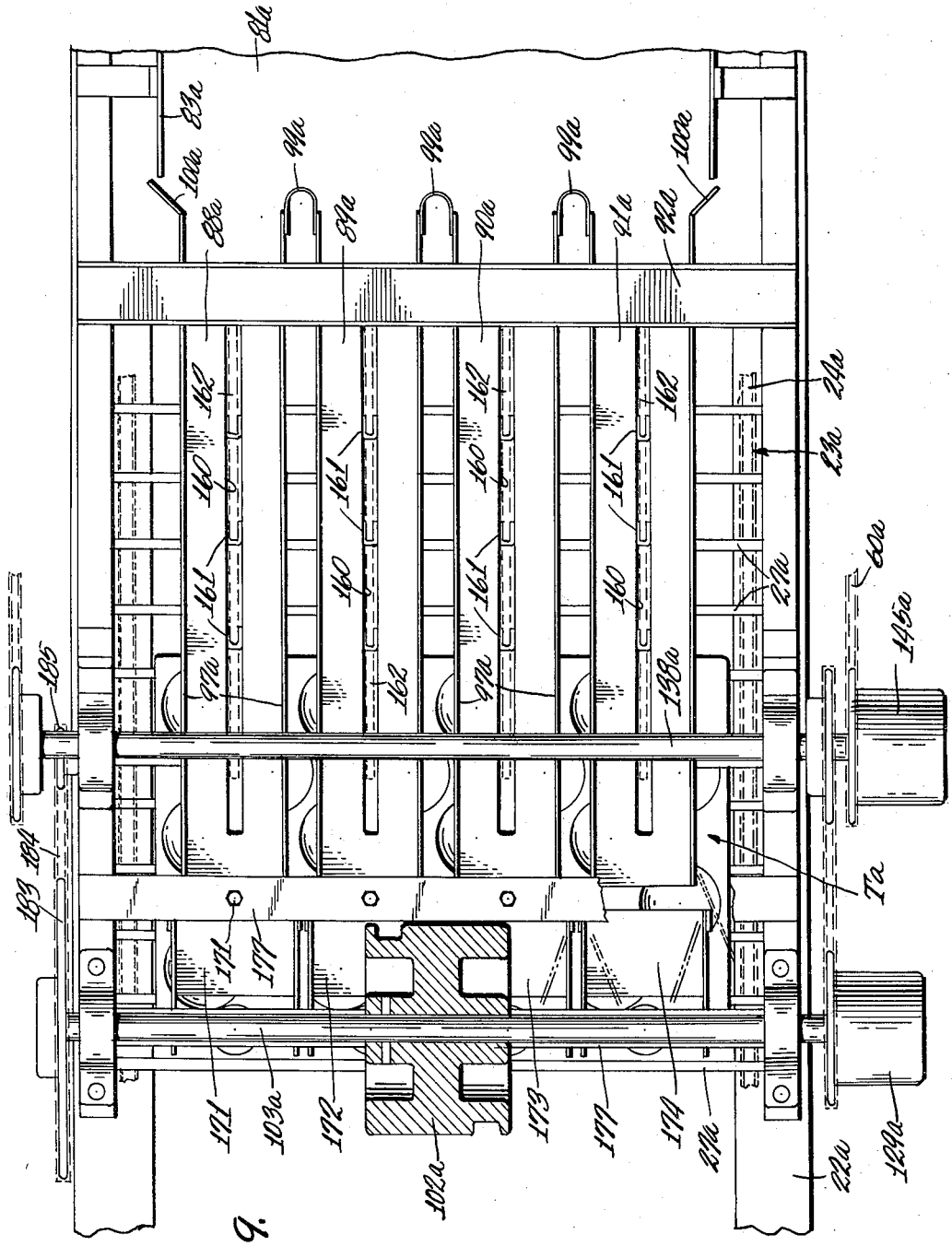

May 13, 1958  C. F. STUART  2,834,169
APPARATUS FOR DEPOSITING ARTICLES INTO RECEPTACLES
Filed May 6, 1954  9 Sheets-Sheet 9
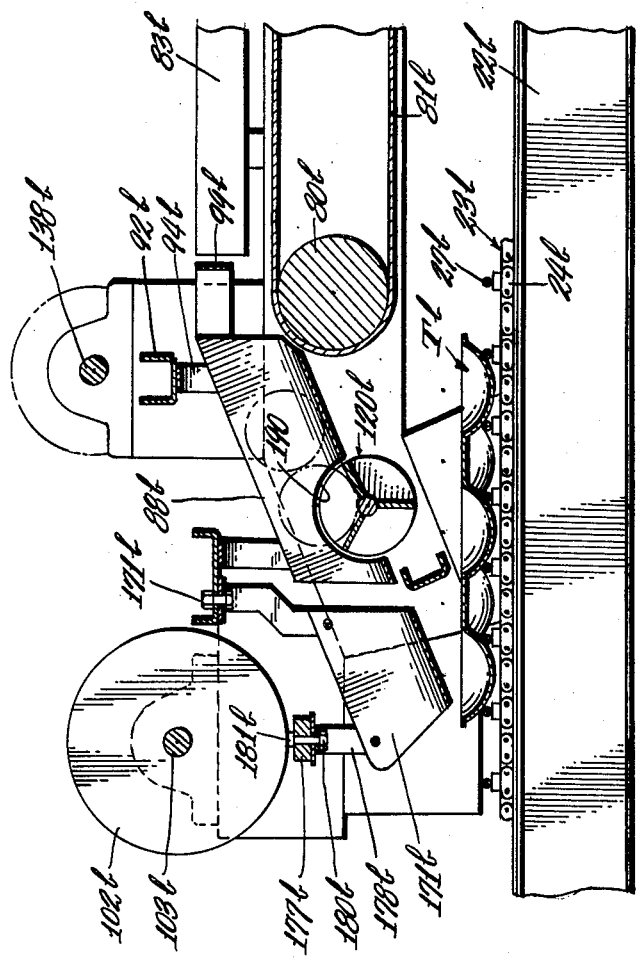
INVENTOR.
CLIFTON F. STUART
BY
*Michael Williams*
ATTORNEY

United States Patent Office 2,834,169
Patented May 13, 1958

2,834,169
APPARATUS FOR DEPOSITING ARTICLES INTO RECEPTACLES

Clifton F. Stuart, Warren, Ohio, assignor to The Clifton-Grant Development Corporation, a corporation of Ohio Application May 6, 1954, Serial No. 427,941

18 Claims. (Cl. 53—246)

This invention relates to apparatus for depositing articles, such as fruit and the like, into a receptacle, such as a tray having a plurality of article receiving recesses, and the principal object of my invention is to provide new and improved apparatus of this character.

Automatic apparatus for packing articles reduces labor cost and increases production and accordingly has great commercial appeal. However, apparatus of such kind in the prior art has been expensive to manufacture and maintain and is unreliable in operation and therefore has not met with favorable commercial acceptance. This is particularly true of apparatus for use with relatively fragile or easily bruised articles, such as fruit and the like.

This invention provides an apparatus for the aforementioned purposes which may be produced at relatively low cost and which may be operated for extended periods with relatively little or no maintenance expense. Further, apparatus in accordance with this invention occupies very little space and may be profitably used by even the smallest of packers.

This invention is especially adaptable for depositing fruit or the like in supporting trays and in the following description the apparatus will be described in connection with the packing of apples, although it should be understood that the invention is not limited to such specific use and may be used to pack other articles such as pears, oranges, eggs and as a matter of fact any articles which must be packed in quantity and which are of a reasonably uniform size or capable of classification to a relatively uniform size.

With specific reference to the art of packing apples or the like, the customary procedure is to deposit such apples on trays which may be made of any suitable material such as pressed cardboard, metal foil, or any other material which is substantially form retaining and possesses a certain amount of rigidity; yet is flexible and yieldable so as to support the apple without bruising the same.

Commercially available trays are made of pressed cardboard of a suitable thickness to support a plurality of apples, and such trays are formed with a plurality of depressions, each to receive an apple and thus to locate the apple in predetermined position on the tray. For purposes of packing the apples in the least amount of space, the depressions are formed in rows, each row having a certain number of depressions, and the depressions of one row are staggered relative to the depressions of an adjoining row.

My invention includes means for supporting a quantity of articles, such as apples, means for effecting relative movement between one or more trays and the supporting means, means for positioning articles in a manner to generally coincide with the spacing of the tray depressions, means for metering the trays from a hopper, and means for metering the articles into the tray depressions, all of the foregoing being properly timed so that an attendant merely has to start the apparatus to effect a complete packing operation, and since such little attention is required of the operator, the latter may attend a plurality of machines.

In the drawings accompanying this description and forming a part of this application, there is shown, for purposes of illustration, embodiments which this invention may assume, and in these drawings:

Figure 1 is a small scale side view of apparatus incorporating this invention,

Figure 1a is a plan view of a tray which may be used with the apparatus of this invention, Figure 2 is an enlarged fragmentary longitudinal sectional view taken through the article supporting and guiding means, Figure 2a is a perspective view of a detail, Figure 3 is a fragmentary plan view of the construction shown in Figure 2, Figure 4 is an enlarged fragmentary side view of the tray feeding mechanism shown in Figure 1, Figure 5 is a fragmentary broken plan view of the tray feeding mechanism shown in Figure 4, Figure 6 is a fragmentary broken sectional view corresponding generally to the line 6—6 of Figures 1 and 5, Figure 7 is a fragmentary enlarged sectional view of a portion of the apparatus shown in Figure 6, Figure 8 is a fragmentary longitudinal sectional view of another embodiment of my invention, Figure 9 is a fragmentary plan view of the embodiment disclosed in Figure 8, and Figure 10 is a fragmentary longitudinal sectional view of another embodiment of my invention.

Referring particularly to Figure 1, the embodiment therein disclosed comprises a base 20 including a plurality of upright legs 21 supporting spaced-apart side members 22—22 (only one of which is seen in Figure 1, the other being directly behind the member which is visible). The side members 22 are preferably of channel construction with the legs of the channel turned outwardly, as best seen in Figure 6. It will be appreciated that the components of the base 20 are rigidly secured together to provide sufficient solidity.

A conveyor 23 runs in the plane including the side members 22—22 and in this instance comprises a pair of spaced-apart chains 24—24 running over sprockets 25—25 journalled adjacent to the ends of the side members 22—22. The chains 24—24 are of a commercially available type and alternate links are formed with extensions 26 which form ledges to which cross-bars 27 are rigidly secured, as by welding or the like. The cross-bars 27 extend crosswise of the chains 24—24 for a purpose later to be described.

The upper reach of the conveyor 23 is disposed just above the upper flange of each side member and in the present embodiment it is preferred to support such upper reach against sagging. As best seen in Figure 6, the upper flange of each side member 22—22 is provided with a longitudinally extending wear plate 28 and the lower edges of the chains 24—24 ride on respective wear plates, the relatively rigid cross-bars 27 thereby being held against sagging.

As before mentioned, any one of a number of commercially available trays may be used with this invention and for purposes of illustration, the tray T shown in plan in Figure 1a and in section in Figures 2 and 6 is formed of pressed cardboard and has a plurality of depressions extending downwardly from its upper surface. Although the depressions are herein shown as formed by unbroken surfaces, it will be appreciated that the tray may be merely apertured, instead of depressed, to provide the pockets for receiving articles.

In the illustrated tray, the depressions are formed in rows 29, 29a, 29b, 29c and 29d, and in the event apertures are used, the latter would also be formed in rows. It is preferred that the tray is placed in the conveyor 23 to move in the direction of the arrow 30 shown in Figure 1a and in the illustrated tray each row has four aligned depressions 31, the depressions in all rows being spaced-apart equally and the depressions of one row being staggered relative to the depressions of an adjoining row. With particular reference to Figure 1a the spacing of the depressions in any one row is shown by the dimension "e" and the staggering of the depressions is preferably accomplished by disposing alternate rows of depressions midway of depressions in adjoining rows, as best seen by the dimension "½e."

It will be appreciated that this invention is not limited to use with trays having depressions spaced as shown in Figure 1a and that such spacing and the number of depressions, and rows thereof, may be varied within certain limitations. Further, although it is preferred to have the tray travel in the direction of the arrow 30 shown in Figure 1a, it is possible, with certain modifications later to be explained, for the tray to be disposed for travel in the direction of the arrow 33.

Means are provided for automatically delivering trays T to the conveyor 23 and as presently preferred such means comprises a hopper 34 which is off-set to the side of one of the side members 22, as best seen in Figure 6. The hopper 34 is supported by frame members 35 which are carried by a support 36 extending laterally of the base 20 and is adapted to contain a plurality of nested trays T.

Means are provided for releasing trays one at a time, from the hopper 34, and in the present embodiment such means comprises a plurality of combined holding and release devices 37 and three of such devices have been found satisfactory for the intended purpose, and as seen in Figure 4, one device is positioned at each side of the hopper and one device is positioned at an end of the hopper to provide a three point suspension which has been found to be adequate.

In the presently disclosed form, each device 37 comprises three plates 38, 39 and 40, the plate 39 preferably being circular and sandwiched between the plates 38 and 40. Each of the devices 37 also includes an upright shaft 41 rotatable in spaced bearings 42—42 carried by the adjacent wall of the hopper 34 and the plates 38, 39 and 40 are secured to each other in fixed relation, as by rivets 43 which also pass through end hubs 44 and the plate and hub assembly is rigidly secured to the respective shaft 41 for rotation therewith by means of a pin 45 which passes through a hub 44 and through the adjacent portion of the shaft 41.

The plates 38 and 40 have portions off-set from the axis of the shaft 41 and as best seen in Figures 5 and 7, such plates have respective off-set portions 46 and 47 diametrically opposed for a purpose which will later appear. The wall of the hopper 34 is formed with a slot 48 so that the off-set portions 46, 47 may freely enter and leave the hopper 34 when each of the devices 37 is rotated.

As best seen in Figure 7, the trays T are nested one-on-top the other and the depressions 31 therein interfit so as to cause the plane portions of adjoining trays to be separated slightly. In Figure 7, the off-set portion 47 of the plate 40 is disposed within the hopper 34 (and all devices are so related that all plates 40 are in similar position) so as to form a support for the entire stack of trays within the hopper.

As the shafts 41 are simultaneously rotated, the off-set portions 47 of the plates 40 will start to leave the interior of the hopper 34 but before such plates leave support of the lowermost tray the off-set portion 46 of the plates 38 will have entered the interior of the hopper and engaged underneath the second lowermost tray to support the entire stack of trays except the lowermost tray.

Thereafter, when the offset portion 47 of the plates 40 is entirely removed from the interior of the hopper 34 by further simultaneous rotation of the shafts 41, the lowermost tray will drop, since it is now unsupported, but the remainder of the stack of trays will now be supported by the off-set portion 46 of the plates 38. Further rotation of the shafts 41 will cause the off-set portion 46 of the plates 38 to leave the interior of the hopper 34, but before such portions have entirely left support of the stack of trays, the off-set portion 47 of the plates 40 will again have entered the interior of the hopper to provide support for the stack of trays. It will be appreciated that the devices 37 will therefore dispense trays T from the hopper 34 in one-at-a-time relation.

To the upper end of each shaft 41 is fixed a miter gear 50 and such gear on the device 37 which is located at the end of the hopper 34 meshes with a miter gear 51 which is fixed to a shaft 52 rotatable in spaced bearings 53—53 carried by the hopper 34. To each end of the shaft 52 is fixed a miter gear 54 and the latter gears mesh with miter gears 55 which are fixed to respective shafts 56 which extend alongside opposite sides of the hopper 34 and are rotatable in bearings 57 carried by such hopper sides. Each shaft 56 fixedly carries a miter gear 58 which meshes with the miter gear 50 of the devices 37 positioned on opposite sides of the hopper. It will therefore be appreciated that all of the devices 37 are tied together for equal and simultaneous rotation.

One of the shafts 56 (see especially Figures 1 and 5) fixedly carries a sprocket wheel 59 over which a chain 60 is trained, such chain being driven in a manner hereinafter to be described for the purpose of effecting rotation of all of the devices 37.

Referring particularly to Figures 5 and 6, a conveyor 61 is disposed below the lower open end of the hopper 34 for moving the trays T falling from the hopper to position on the conveyor 23. In the presently disclosed embodiment a pair of spaced-apart shafts 62—62 are rotatably carried in bearings 63—63 which extend upwardly from the support 36 and each shaft fixedly carries four belt wheels 64. Four belts 65 are trained over respective pairs of belt wheels 64, the belts being spaced-apart, as best seen in Figure 5, to engage with longitudinally aligned underside surfaces of the depressions 31 formed in the tray. In this manner, the tray is held against cocking when it strikes the conveyor 61 and sufficient surface contact is made with the tray to readily overcome inertia of the latter.

One of the shafts 62 is connected to a source of rotation power, and at the present time it is preferred to employ a separate motor (not shown) for this purpose, the motor rotating in a direction to cause the upper reach of the belts 65 to travel in a direction toward the conveyor 23. The speed of the motor is such as to move the conveyor 61 at a fairly good rate so that as a tray T falls from the hopper 34 onto the upper reach of the belts 65, such tray is thrown, by action of the conveyor, to strike against a guide plate 70 which is supported in part by one of the side members 22. The tray should not be thrown with such great velocity that it bounces back from the guide plate 70, but preferably should be thrown with sufficient velocity so that it strikes the guide plate 70 and gently settles onto the conveyor 23.

As seen in Figure 5, the guide plate 70 extends some distance longitudinally of the apparatus and ultimately cooperates with a spaced guide member 71 to properly align the tray transversely of the conveyor 23. The guide member 71 has a curved entrance portion 72 to assist in guiding the tray to position between the plate 70 and member 71.

A conveyor 75 is positioned above at least a portion of the conveyor and extends from a shaft (not shown) disposed adjacent to a source of supply of articles to a shaft 76 journalled at a point beyond the tray hopper 34 (see Figure 1). The aforementioned shafts are mounted for rotation in bearings 77 (only one set of bearings being shown in Figure 6) and such bearings are carried by channel members 78 which are supported by uprights 79 extending from the side members 22—22.

The shaft 76 carries a roller 80 and the spaced shaft (not shown) carries a similar roller, and over such rollers is trained a wide, preferably flat, belt 81 which supports the articles to be deposited into the tray depressions and which moves such articles toward an article positioning means 82. Suitable stationary side guards 83 may be positioned at opposite sides of the belt 81 to prevent articles from falling from the belt.

The side members 78—78 have forward portions which angle downwardly toward the side-members 22—22, as shown at 84 in Figure 1, and strut members 85 extend between portions 84 and side-members 22 for rigidity purposes.

Articles from a suitable source of accumulation, may be deposited on the supporting belt 81 of the conveyor, and such articles will therefore be moved by the conveyor in a direction toward the roll 80 and such articles need not be placed on the belt 81 in any order and therefore little time and attention is required in this respect. The source of accumulation may be an article grader or article cleaner of any well-known construction.

The positioning means 82 hereinbefore mentioned receives articles forwarded by the belt 81 and positions such articles in predetermined order to correspond to the spacing of the depressions 31 in the trays T. As best seen in Figure 2, the tray moves relative to the article supporting means, which in the present case is the belt 81, and beyond a forward portion thereof, and the articles are then received by the positioning means and arranged in proper order, the positioning means being movable transversely of the conveyor 23 to align with depressions in any one of the rows of depressions formed in the tray.

Referring particularly to Figures 2 and 3, the embodiment of the positioning means therein shown comprises a plurality of guide means for the articles received from the belt 81. In the particular construction referred to, the guide means comprises four chutes 88, 89, 90 and 91 since the tray T is moving in a direction to present four depressions in each row thereof.

That end of each of the chutes which is adjacent to the belt 81 is pivotally supported from a transversely extending channel 92 which has opposite ends supported by uprights 93 extending upwardly from respective side members 22—22. The chutes may be pivotally mounted on the channel 92 in any suitable manner and a suggested construction is to provide a U-shaped clip 94 for each chute, the bight of the U being pivotally connected to an adjoining part of the channel 94, as by means of the nut and bolt connection 95 (see Figure 2) and the legs of the U being connected to opposite sides of the chute as by means of rivets 96.

Each of the chutes 88, 89, 90 and 91 may be formed of any suitable material and may have any suitable cross section depending largely upon the articles to be positioned thereby. In the presently disclosed embodiment the chutes are used to position articles having some degree of roundness, such as apples A, and at the present time each of the chutes is formed of sheet metal and of generally trough-shape in cross section, comprising relatively straight side sections 97—97 joined by an integral rounded bottom section 98.

Adjoining side sections of chutes 88, 89, 90 and 91 are joined by loops 99 which may be formed of sheet metal strap and may have their leg portions joined to adjoining side sections in any suitable manner, such as by spot welding. The outer side sections 97 of chutes 88 and 91 are provided with arcuate guide members 100—100 which also may be formed of sheet metal strap and spot welded in place. The guide members 100 are curved outwardly beyond the guide plates 83 and serve to direct articles from the belt 81 to the chute openings. Likewise, the loops 99 tend to segregate the articles which are indiscriminately supported on the belt 81, and the loops and guide members serve to direct articles into single file arrangement in each of the chutes 88, 89, 90 and 91, as suggested by the apples A shown in dotted lines in Figure 2.

The underside of each chute is notched, as shown at 101 (see Figure 2) to clear the belt 81 and thus permit disposition of the upper end of each chute as close as possible to the upper reach of the belt 81. Thus, apples from the belt are segregated into four columns (in the present embodiment) by the loops 99 and guide members 100 and gravitate toward the lower end of each chute, and since the belt 81 is constantly bringing apples to the chutes, the latter will be generally filled at all times.

The chutes 88, 89, 90 and 91, at their lower ends, are adapted to be shifted transversely of the direction of movement of the conveyor 23, and in the presently disclosed embodiment such shifting action is accomplished through action of a drum cam 102. The cam 102 is carried by a shaft 103 which is rotatable in bearings 104—104, respectively carried by the lower ends 105 of side members 84—84, blocks 106 being mounted on the ends 105 to properly position the shaft 103. The bearings 105 are preferably combined roller and thrust bearings to provide for free rotation of the shaft 103 and to cooperate with shoulders on the shaft (not shown) to maintain the shaft 103 against axial shifting.

The cam 102 is secured to the shaft 103 for rotation therewith and is held against axial displacement by means of a pin 107 which passes through a hub of the cam and through an aperture in the shaft. The cam 102 is formed with a cam groove 108 in its peripheral face and as best seen in Figure 3 the groove has a dwell 109 at its one side, and an inclined portion 110 connecting with another dwell 111 at the opposite side of the cam. Figure 3 shows only the upper side of the cam and it will be appreciated that the underside thereof is similarly formed with dwells and an inclined connecting portion so that the cam follower 112 which fits within the cam groove is alternately moved from one side of the cam to the other during rotation of the cam.

The cam follower 112 is rotatably carried by a bearing block 113 which is securely fixed to a slide bar 114 and the latter is mounted for sliding movement crosswise of the blocks 106 by means of slide bearing 115—115 secured to respective blocks 106. Thus, rotation of the cam 102 will cause endwise shifting of the slide bar 114.

The lower end of each of the chutes 88, 89, 90 and 91 is pivotally suspended from the slide bar 114 and a suggested manner of suspension is to secure the legs 116 of a U-shaped member to the lower end of each chute, as by rivets 117 and pivotally secure the bight 118 of each member to proper position on the slide bar 114, such as by means of the nut and bolt connection 119.

Thus, as the cam 102 rotates, the lower ends of the chutes 88, 89, 90 and 91 will be shifted transversely of the movement of the conveyor 23, such shifting being permitted by the pivotal connection 95 of the upper ends of the chutes with the fixed channel 93. In the embodiment so far disclosed, the throw of the cam, that is, the distance between dwells 109—111 is equal to the dimension "½ e" shown in Figure 1a so that the lower ends of the chutes may be aligned with the depressions in either row of depressions in the tray T.

A metering device 120 is provided for cooperation with the lower ends of the chutes 88, 89, 90 and 91 to block flow of apples from such chutes until their lower ends are properly aligned with a proper row of tray depressions. In the presently disclosed embodiment, the metering device comprises a shaft 121 which extends crosswise of side members 84—84 and is rotatably supported in bearings (not shown) carried by such members. Secured to the shaft, as by welding, are spaced-apart discs 122, the spacing between the discs being preferably sufficient to accommodate the extreme shifting movement of the chutes 88, 89, 90 and 91.

The meter device 120 further comprises a series of longitudinally extending compartments for receiving the articles leaving the lower ends of the chutes. In the present case three longitudinally extending plates are provided, although it will be appreciated that this number may be varied to suit requirements. In the present disclosure, the plates 123 are preferably welded to the shaft 121 and to the discs 122—122 to form three longitudinally extending compartments of substantially equal volume. The lower end of each of the chutes 88, 89, 90 and 91 is notched, as shown at 124, so that a considerable portion of each chute overhangs the metering device 120 and insures that the articles will be directed to proper position in the respective compartments of the metering device. Exteriorly of one of the side members 84 (the upper side member in Figure 3) a sprocket 125 is fixed to the shaft 121 for the purpose of rotating the same.

A chain 126 is trained over the sprocket 125 and over a sprocket 127 rigidly secured to one end (the upper end in Figure 3) of the cam carrying shaft 103, the sprockets 125 and 127 being relatively proportioned so that shafts 103 and 121 rotate at proper relative speeds, whereby rotation of the cam 102 will shift the chutes to align with one row of recesses and a row of articles will be dropped from one compartment of the metering device 120 while further flow of articles from the chutes is blocked by a longitudinally extending plate 123, and further rotation of the cam 102 will shift the chutes to align with a succeeding row of recesses while the metering device has been rotated to receive a row of articles in a succeeding compartment and to drop such articles into such succeeding row of recesses. The opposite end of the shaft 103 has a sprocket 128 rigidly secured to a solenoid operated clutch 129, the latter being of any commercially available type and a type presently found suitable is manufactured by The Hilliard Corporation of Elmira, New York, and identified as an interrupter roller clutch. The clutch 129 is of the type wherein the sprocket 128 rotates idly relative to the shaft 103 until the solenoid is energized, whereupon the sprocket 128 is locked to drive the shaft for a predetermined amount of rotation. In the present embodiment, the cam 102 is so designed that one revolution of the shaft will move the cam and consequently shift the chutes to fill all five rows of depressions in the tray and therefore in the present embodiment when the solenoid of clutch 129 is energized, the clutch will cause the sprocket 128 to rotate the shaft one complete revolution and then disengage the sprocket from the shaft. It will be appreciated, however, that certain circumstances, as a change in tray design, may require the clutch to cause driving relation between the sprocket and the shaft a greater or lesser amount.

An ordinary friction brake 135 may cooperate with the shaft 103, the brake engaging the shaft and providing sufficient fixed drag thereon to prevent over-running of the cam 102 when the clutch 129 is disengaged.

The sprocket 128 is connected by a chain 136 with a sprocket 137 which is rigidly mounted on a cross-shaft 138. The shaft 138 is rotatable in bearings 139—139 carried by the side members 84—84 and has a sprocket 140 (see upper end of shaft in Figure 3) which is connected by a chain 141 (see Figure 1) to a motor, such as the electric motor 142 carried by a support 143 which forms part of the base 20.

Otuwardly of the sprocket 137 (see Figure 3) a second sprocket 144 is mounted on the shaft 138, this latter sprocket being connected to a solenoid operated clutch 145 which may be identical to the clutch 129 hereinbefore described, and the clutch 145, in this particular case, also locks the sprocket 144 to the shaft 138 for one revolution and thereafter disengages such sprocket from the shaft. The sprocket 144 is connected, by chain 60, to the sprocket 59 which drives the tray dispensing mechanism.

Referring particularly to Figure 1, a sprocket 147, also on the shaft of motor 142, is connected by chain 148 to a sprocket 149 which drives the conveyor 23. On the chain 148 are a number of lugs 150 which move with the chain and each of which is adapted to trip an electric switch, such as the micro-switch 151. When the switch 151 is tripped, electrical current is momentarily caused to flow to the solenoid of clutch 145, and such momentary energization is sufficient to cause the clutch to rotate one revolution and cause the dispensing of one tray T from hopper 34 to conveyor 61, and from there the tray is moved to position on the conveyor 23. The number of lugs 150 may be varied (two being shown in Figure 1) depending on the frequency with which a tray may be delivered to conveyor 23.

A micro-switch 152 (see Figure 2) is carried by one of a pair of channel members 153 which extend between side members 84—84, and such switch has an operating member in the form of a feeler-finger 154 positioned in the path of movement of the tray T and preferably positioned to be engageable with a relatively flat side edge surface 155 (see Figure 1a) of the tray T.

As the tray T is moved in its path by the conveyor 23 to a place adjacent to the positioning means 82, the tray engages the feeler-finger 154 and this trips the switch 152 and effects energization of the solenoid of clutch 129, whereupon the latter causes one revolution of the shaft 103 to cause proper transverse shifting of the chutes and to cause one and two-thirds revolutions of the metering device 120.

In operation, and assuming articles (such as apples or the like) are supplied in suitable amounts to the belt 81 and a plurality of trays T are stacked within the hopper 34, the operator merely has to turn an electric switch (not shown) to effect energization of the motor 142. The chains 140 and 148 thereupon will be constantly driven, and the lugs 150 will strike the operating arm of switch 151 to effect energization of the solenoid of clutch 145 and thereby automatically cause delivery of a tray T to the conveyor 23 in the manner hereinbefore described.

It should be pointed out that the under surfaces of the tray defining the depressions provide protuberances which nestle between rods 27 of the conveyor and thereby effect positive driving relation between the tray and the conveyor. Further, since the central portions of the depressions (as best seen in Figure 2) are unsupported except for their connection to the remainder of the tray, such unsupported portions are effective to absorb shock induced when the articles drop into the depressions and this is of importance since the articles are thus restricted against bouncing action when they hit the tray. This feature is especially valuable when packing fruit, since the shock of the dropping fruit is absorbed and danger of bruising of the fruit is reduced. A certain amount of shock is also absorbed by the rods 27 since such rods are resilient and spring slightly when a sudden load is applied thereon.

The tray T on the conveyor 23 is properly positioned laterally of the conveyor by the guide surfaces provided by members 70, 71 (see Figure 5) and as the tray moves toward the metering device 120, it engages the feeler-finger 154 of micro-switch 152, whereupon solenoid of clutch 129 is energized and shaft 103 is driven one revolution.

Figures 2 and 3 show the condition of parts after the shaft 103 has started to move through its revolution and show apples A in the chutes 88, 89, 90 and 91 and further show that four apples have already been delivered to a longitudinal compartment of the metering device and are dropping therefrom into the first row of depressions in the tray T. During this time a longitudinal plate 123 of the metering device 120 is blocking subsequent apples in the chutes, but as the metering device is rotated, the next succeeding row of apples in the four chutes will be permitted to enter the succeeding longitudinal compartment of the metering device and simultaneously the cam 102 will cause transverse shifting of the chutes to align the same with the second staggered row of depressions in the tray whereupon the metering device will have rotated to deliver the four apples in the longitudinal compartment to the four depressions in the tray. This action will continue until all rows of depressions are filled and rotation of the shaft 103 will then automatically cease.

The loaded tray will then move along the conveyor 23 to the left hand end thereof (Figure 1) where it may be removed by the operator or may be deposited on a transverse conveyor (not shown) for delivery to a box packing station. Trays T will be dispensed from the hopper 43 each time a lug 150 strikes the operating member of the switch 151, and the filling of trays will automatically continue so long as trays issue from the hopper and move along the conveyor 23 to strike the feeler-finger 154 of the micro-switch 152.

In the event the tray T is turned for movement along the conveyor 23 in the direction of the arrow 33 of Figure 1 it will be appreciated that the number of depressions in each row will be alternately uneven, that is, in the embodiment described three apples, two apples, three apples, and so on are to be deposited in the depressions of the tray. In such case one of the chutes may be permanently blocked (or alternately only three chutes may be used) and the longitudinal compartments of the metering device 120 may be blocked at proper places to dispense only two apples at the proper time.

In the embodiment of the invention shown in Figures 8 and 9, certain parts of the foregoing construction are used and such parts will be identified by reference numerals previously used but with the addition of the suffix "a." In this embodiment, a tray Ta is deposited on a conveyor 23a in the manner previously described. Four chutes 88a, 89a, 90a and 91a are provided which are quite similar to the chutes hereinbefore described, but with certain modifications which will be pointed out. In this embodiment the chutes are rigidly held against movement and this may be accomplished by welding the U-shaped supporting clips 94a to the transverse channel 92a, and welding the lower ends of the chutes to the transverse channel 153a.

Each of the chutes is formed with a longitudinal slot 160 which extends throughout a greater portion of the respective chute to pass a plurality of wicket-like wire fingers 161 which extend transversely, in spaced-apart relation, from a chain 162 cooperable with the respective chute. Each chain 162 is trained over sprockets 163, 164 and 165, the sprockets 163 and 164 being respectively carried by shafts 166 and 167 which are rotatable in bearings carried by side members 84a—84a and the sprockets 165 being carried by a shaft 168 rotatable in bearings carried by lugs 169 extending downwardly from the side members 84a.

Each chute has a depression 170 at its upper end forming a pocket for receiving an apple forwarded by the belt 81a and the apples remain in such pockets until they are picked up by one of the fingers 161 on the respective chains 162, whereupon such apples will be delivered downwardly of respective chutes at a speed governed by the peripheral speed of the chains 162.

In this particular embodiment the metering device 120 is eliminated and the chains 162 govern disposition of the apples.

At the lower end of the chutes 88a, 89a, 90a and 91a four sub-chutes 171, 172, 173 and 174 are disposed for cooperation with respective chutes, the sub-chutes being somewhat similar in cross-section to their corresponding chutes but being considerably shorter, as best seen in Figure 8, and somewhat wider than their corresponding chutes, as best seen in Figure 9. The bottom of each sub-chute is preferably extended to underlie the bottom of a corresponding chute to form an unbroken path for the apples and thereby avoids bruising of the same. It will be appreciated that such extension of the bottom need only be quite narrow so as not to affect cooperation between the chutes and sub-chutes.

The sub-chutes are mounted for shifting movement transversely of the conveyor 23 without interrupting communication with their respective chutes and in the embodiment disclosed in Figures 8 and 9 each of such sub-chutes is supported by a U-shaped clip 173, the legs of each clip being pivotally connected as by the nut and bolt connection 171 to a channel 175 which extends cross-wise and is secured to blocks 106a.

The exit end of the sub-chutes are connected together so that all sub-chutes pivot simultaneously and in uniformity. This may be accomplished by means of a slide bar 177 which extends cross-wise of blocks 106a and is slidably supported in slide bearings formed therein. The legs of a U-shaped clip 178 are connected, as by rivets 179, to opposite sides of respective sub-chutes, and the bight of each clip is pivotally connected to the slide bar 177 by a nut and bolt connection 180. Thus, the exit ends of the sub-chutes are held in fixed spaced-apart relation and each sub-chute may swing about its pivot 171.

The slide bar 177 carries a follower 181 which fits in the groove of the cam 102a and rotation of the shaft 103a will rotate the cam 102a and effect simultaneous reciprocation of the sub-chutes about their pivots 171. For convenience and clearness in the drawing, the sub-chutes have been shown in a central position which they momentarily assume when shifting from one extreme to another. However, it will be appreciated that the throw of the cam groove is similar to that hereinbefore described so that the sub-chutes may swing from one extreme position (shown in dotted lines in Figure 9) to the other extreme position (shown in dot-dash lines in Figure 9). The distance between the two extreme positions is generally equal to the distance "½ e" between depressions in successive rows, as shown in Figure 1a.

The shaft 103a has a relatively large sprocket 183 fixed to one end (the upper end in Figure 9) and a chain 184 is trained over this sprocket and over a sprocket 185 which is fixed to the shaft 166. The differential size of the sprockets 184, 185 is such that one revolution of the cam 102a will equal movement of the chains 162 in sufficient amount so that five successive rows of apples A will be passed to the sub-chutes 171, 172, 173 and 174 for deposition in respective rows of depressions in the tray Ta.

In the operation of the embodiment shown in Figures 8 and 9, apples from the belt 81a will be urged toward the positioning means 82a so that the pockets 170 of all chutes 88a, 89a, 90a and 91a will be filled. A tray Ta is dispensed from a hopper and onto the conveyor 23a in the manner hereinbefore described and as the tray Ta moves towards the sub-chutes it will engage the feeler-finger of a micro-switch as before. This will energize the solenoid of clutch 129a and start rotation of the cam 102a and simultaneous movement of the chains 162 in the direction of the arrow 186 shown in Figure 8.

The fingers 161 which approach the pockets 170 will lift the apple from its pocket and cause it to move down its respective chute at the speed of chain movement. As the fingers 161 reach the shaft 166 they will be rotated downwardly to clear the supported apples and permit them to gravitate down the respective sub-chutes 171, 172, 173 and 174, it being kept in mind that a row of four apples are delivered simultaneously to the sub-chutes.

As the apples are metered down the chutes and into the sub-chutes, the cam 102a is causing proper shifting action of the sub-chutes to successively align the exit end of such sub-chutes with alternate rows of depressions in the tray Ta and this is continued until all rows are filled with apples, whereupon the cam 102a and chains 162 will cease movement, by reason of interruption of power by the clutch 129a. The filled trays are then moved by the continuously moving conveyor 23a to a box filling station, or such trays are removed from the conveyor by the operator.

The embodiment of the invention shown in Figure 10 is somewhat similar to the embodiment shown in Figures 8 and 9 and like parts of the embodiment shown in Figures 8 and 9, and in the embodiment shown in Figures 1 through 7 will be designated by like reference numerals supplemented by the suffix "b."

In the embodiment of Figure 10, the chutes (only 88b being shown) are similar to the chutes of the embodiment disclosed in Figures 8 and 9 in that such chutes are held in fixed position. However, the chutes in this embodiment are considerably less in length and the chains 162 are omitted and a metering device 120b is positioned so that it fits within notches 190 in the bottoms of the chutes. Sub-chutes (only sub-chute 171b being shown) are mounted for transverse shifting action at the exit end of the chutes in the manner described in the embodiment disclosed in Figures 8 and 9, to direct the rows of apples metered by the metering device 120b to proper deposition in the rows of depressions in the tray Tb.

The embodiment shown in Figure 10 is actually a composite of the two embodiments hereinbefore described and it is believed the operation of this embodiment will be evident from the foregoing description; this embodiment being advantageous since it permits reduction of the overall size of the apparatus.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. Apparatus for depositing articles, such as fruit and the like, in the recesses in a tray wherein such recesses are arranged in a path in staggered relation, comprising a hopper for a plurality of aforementioned trays, supporting means for supporting a plurality of articles, a conveyor underlying said supporting means and adapted to carry a tray for movement relative to said supporting means and in the direction of said path whereby successive recesses along said path are positioned in juxtaposed relation with respect to a portion of said supporting means, means for releasing said trays from said hopper one at a time at spaced-apart intervals and for depositing said trays on said conveyor in successive relationship, positioning means at said supporting means portion for receiving articles from said supporting means and for positioning said articles for deposition into respective tray recesses, said positioning means being shiftable transversely of the direction of movement of said conveyor, and means for timing shifting movement of said positioning means in accordance with the position of the tray relative to said positioning means whereby the latter will align and move in accordance with the disposition of said recesses.

2. Apparatus for depositing articles, such as fruit and the like, in the recesses in a tray wherein such recesses are arranged in a path in staggered relation, comprising supporting means for supporting a plurality of articles, a conveyor underlying said supporting means and adapted to carry a tray for movement relative to said supporting means and in the direction of said path whereby successive recesses along said path are positioned in juxtaposed relation with respect to a portion of said supporting means, positioning means at said supporting means portion for receiving articles from said supporting means and positioning said articles for disposition into respective tray recesses, said positioning means being mounted for reciprocating movement in a direction cross-wise to the movement of said conveyor, and means for effecting reciprocation of said positioning means an amount generally equal to the transverse distance between adjoining staggered recesses and in timed relation with the distance between adjoining recesses along said path.

3. The combination comprising a tray of flexible material having depressions therein defining recesses for receiving articles such as fruit and the like, a conveyor adapted to carry a tray and engageable therewith at places spaced from those tray surfaces defining the bottom of said depressions whereby said tray surfaces are unsupported except for connection with adjoining parts of the tray, and means for dropping articles into said recesses, said unsupported tray surfaces receiving the dropped article and being adapted to cushion its fall whereby damage and bouncing of the dropped article is reduced.

4. The combination comprising a tray formed of flexible material having a plurality of spaced-apart depressions therein, each defining a recess for receiving an article, such as fruit and the like, a conveyor adapted to carry a tray and engageable therewith at places spaced from those tray surfaces defining the bottom of said depressions whereby said tray surfaces are unsupported except for connection with adjoining parts of said tray, portions of the surfaces defining said depressions abutting portions of said conveyor to establish generally positive driving relation between said conveyor and the supported tray, and means for dropping articles into said recesses, said unsupported tray surfaces receiving the dropped article and being adapted to cushion its fall whereby damage and bouncing of the dropped article is reduced.

5. Apparatus for depositing articles, such as fruit and the like, in the recesses in a tray wherein such recesses are arranged in spaced-apart rows and wherein such recesses in each row are spaced-apart a corresponding amount with the recesses in one row being staggered relative to the recesses in an adjoining row, comprising supporting means for supporting a plurality of articles, a conveyor underlying said supporting means and adapted to carry a tray for movement relative to said supporting means and in a path whereby successive rows of recesses are positioned in juxtaposed relation with respect to a portion of said supporting means, guide means comprising a plurality of guide members of a number equal to the number of recesses in any one of said rows, said guide means receiving articles from said supporting means and guiding them to position adjacent to said support means portion and holding said articles at such portion in a row in spaced-apart relation generally similar to the disposition of the recesses in any one of said rows, said guide means being shiftable transversely of the direction of movement of said conveyor whereby a row of articles from said guide means may be disposed to generally align with the recesses of any one of said tray rows.

6. Apparatus for depositing articles, such as fruit and the like, in the recesses in a tray wherein such recesses are arranged in spaced-apart rows and wherein such recesses in each row are spaced-apart a corresponding amount with the recesses in one row being staggered relative to the recesses in an adjoining row, comprising supporting means for supporting a plurality of articles, a conveyor underlying said supporting means and adapted to carry a tray for movement in a path whereby successive rows of recesses are positioned in juxtaposed relation with respect to a portion of said supporting means, guide means comprising a plurality of chutes disposed in side-by-side relation and of a number equal to the number of recesses in any one of said rows, said chutes receiving articles from said supporting means and being inclined downwardly so that said articles gravitate therealong, metering means adjacent to the lower end of said chutes for selectively blocking fall of articles therefrom and for holding said articles in a row in spaced-apart relation generally similar to the disposition of the recesses in any one of said rows, said guide means being shiftable transversely of the direction of movement of said conveyor whereby a row of articles at said metering means may be disposed to generally align with the recesses of any one of said tray rows, and means for operating said metering means to release said row of articles when said guide means has been shifted to align with the recesses of any one of said rows.

7. Apparatus for depositing articles, such as fruit and the like, in the recesses in a tray wherein such recesses are arranged in spaced-apart rows and wherein such recesses in each row are spaced-apart a corresponding amount with the recesses in one row being staggered relative to the recesses in an adjoining row, comprising supporting means for supporting a plurality of articles, a conveyor underlying said supporting means and adapted to carry a tray for movement in a path whereby successive rows of recesses are positioned in juxtaposed relation with respect to a portion of said supporting means, guide means comprising a plurality of guide members of a number equal to the number of recesses in any one of said rows, said guide means receiving articles from said supporting means and guiding them to position adjacent to said supporting means portion, metering means at said supporting means portion and comprising a member rotatable about an axis transverse with respect to movement of said conveyor and having a plurality of longitudinally extending partitions which form longitudinal compartments each of which is adapted to receive articles from said guide means and cooperate therewith to hold such articles in a row in spaced-apart relation generally similar to the disposition of the recesses in any one of said rows, said guide means being shiftable transversely of the direction of movement of said conveyor whereby a row of articles from said guide means may be disposed to generally align with the recesses of any of said tray rows, and means for effecting rotation of said metering means to release articles therefrom and to said tray when said guide means is aligned with the recesses of any one of said tray rows.

8. Apparatus for automatically depositing articles, such as fruit and the like, in a tray, comprising means for receiving said articles, a continuously movable conveyor having a reach movable adjacent to said receiving means, a hopper for storing a plurality of trays, means for dispensing trays one at a time from said hopper onto said conveyor, escapement means for selectively holding said articles against movement from said receiving means, means actuated by the presence of a tray adjacent to said escapement means for operating the latter to release the held articles into said tray.

9. Apparatus for depositing articles, such as fruit and the like, in each of a plurality of recesses in a tray wherein such recesses are arranged in a path in successive staggered relationship, comprising article supporting means, means effecting relative movement of said tray and said supporting means along said path, guiding means for guiding articles to said recesses, means for shifting said guiding means cross-wise of said path an amount and in accordance with the staggered relationship of said successive recesses, means for moving said articles in predetermined relation along said guiding means to release the same to said tray recesses at predetermined time intervals, and means for timing said moving means and said shifting means with movement of said tray along said path whereby articles are released from said guiding means in time and position with the tray recesses to be filled.

10. Apparatus for depositing articles, such as fruit and the like, in each of a plurality of recesses in a tray wherein such recesses are arranged in a path in successive staggered relationship, comprising chute means for guiding said articles, means effecting relative movement of said tray and said chute means along said path, shiftable sub-chute means at the exit end of said chute means for receiving articles issuing therefrom, and means for shifting said sub-chute means cross-wise of said path an amount generally equal to and in accordance with the staggered relationship of successive tray recesses.

11. Apparatus for depositing articles, such as fruit and the like, in each of a plurality of recesses in a tray wherein such recesses are arranged in a path in successive staggered relationship, comprising fixed chute means for guiding said articles, means effecting relative movement of said tray and said fixed chute means along said path, shiftable sub-chute means at the exit end of said fixed chute means for receiving articles issuing therefrom, means for regulating flow of articles from said chute means to said sub-chute means, and means for shifting said sub-chute means cross-wise of said path an amount generally equal to and in accordance with the staggered relationship of successive tray recesses.

12. Apparatus for depositing articles, such as fruit and the like, in each of a plurality of recesses in a tray wherein such recesses are arranged in a path in successive staggered relationship, comprising fixed chute means for guiding said articles, a conveyor for moving said tray along said path and relative to said fixed chute means, shiftable sub-chute means at the exit end of said fixed chute means for receiving articles issuing therefrom, said fixed chute means having abutment members movable therealong and against which said articles engage for regulating the flow of articles from said fixed chute means to said sub-chute means, rotatable cam means for shifting said sub-chute means cross-wise of said path for selectively aligning the exit of said sub-chute means with any of the staggered recesses, aand means timing rotation of said cam means and movement of said partition members whereby articles are delivered from said sub-chute means to successive recesses when said sub-chute means has been shifted to alignment with the respective recesses to be filled.

13. Apparatus for depositing articles, such as fruit and the like, in containers, comprising article supporting means, a first conveyor for moving said container relative to said article supporting means, means for delivering articles from said supporting means to said container, a second conveyor running transversely of said first conveyor, means for disposing a container on said second conveyor, the latter having a portion in juxtaposed and cooperating relation with respect to said first conveyor whereby the container thereon is automatically moved thereby to position on said first conveyor.

14. Apparatus for depositing articles, such as fruit and the like, in containers, comprising article supporting means, a first conveyor for moving said container relative to said article supporting means, means for delivering articles from said supporting means to said container, a second conveyor running transversely of said first conveyor, a hopper for holding a plurality of containers and having an exit opening overlying said second conveyor, means for dispensing containers one at at time from said hopper whereby the dispensed container drops onto said second conveyor, movement of the latter being imparted to the container dropped thereon to throw the container over to and onto said first conveyor.

15. Apparatus for depositing articles, such as fruit and the like, in each of a plurality of recesses in a tray wherein such recesses are arranged in a path in successive staggered relationship, comprising a constantly moving belt for receiving articles, positioning means having an entrance end adjoining said belt for receiving articles moved thereto by said belt and a discharge end for discharging articles to said tray, a first conveyor for moving a tray along said path and in adjoining manner with respect to the discharge end of said positioning means, a constantly moving second conveyor running transversely to said first conveyor, a hopper for holding a plurality of trays and having an exit opening overlying said second conveyor, means for dispensing trays one at a time from said hopper whereby the dispensed container drops onto said second conveyor, movement of the latter being imparted to the tray dropped thereon to throw the tray over to and onto said first conveyor, and means for shifting the discharge end of said positioning means cross-wise of the path of movement of said tray in timed relation with tray movement and in amounts generally equal to and in accordance with the staggered relationship of successive tray recesses, whereby articles leaving the discharge end of said positioning means are delivered to successive recesses.

16. The combination of a tray having a plurality of recesses arranged in rows in equal number, the recesses in adjoining rows being in offset relation to provide a staggered pattern, with apparatus for depositing articles, such as fruit and the like, into successive rows of said tray recesses, comprising means having an article discharge portion whereat said articles are positioned for discharge in successive adjoining rows, each row containing articles in number equal to the number of recesses in a tray row, means for discharging the leading row of articles and presenting the next row of articles for discharge, means for moving said tray under said row of articles, and means for relatively shifting said tray and said discharge portion to automatically align each succeeding row of articles with each succeeding row of tray recesses, whereby said articles are positioned for deposition in aligned tray recesses.

17. The combination of a tray having a plurality of rows of recesses, the recesses in adjoining rows being in staggered relation, with apparatus for depositing articles, such as fruit and the like, into successive rows of said tray recesses, said apparatus comprising positioning means having an article exit portion, means for effecting relative movement of said tray and said positioning means along a path whereby the rows of tray recesses pass successively in juxtaposition with respect to said exit portion, said positioning means positioning said articles in a plurality of rows extending longitudinally of said path for movement to said exit portion and including means for arranging at least the articles at said exit portion in a row extending crosswise of said path, means for effecting relative movement between said tray and at least said exit portion cross-wise of said path in timed relation with the relative movement of said tray and said positioning means to generally align the transverse row of articles at said exit portion with the staggered relation of adjoining rows of recesses as said rows successively pass said exit portion.

18. The combination of a tray having a plurality of rows of recesses, the recesses in adjoining rows being off-set to provide a staggered pattern, with apparatus for depositing rollable articles into successive rows of said tray recesses, said apparatus comprising supporting means for supporting a plurality of said articles for rolling movement toward an exit portion, means for effecting relative movement of said tray and said supporting means along a path whereby the rows of recesses pass successively below and relative to said exit portion, said supporting means including means for arranging at least the articles at said exit portion in a row extending cross-wise of said path, means for effecting relative movement between said tray and at least said exit portion cross-wise of said path in timed relation with the relative movement of said tray and said supporting means to generally align each succeeding transverse row of articles at said exit portion with the off-set relation of recesses in adjoining rows as such rows successively pass under said exit portion to thereby provide for deposition of said articles into respective tray recesses.

References Cited in the file of this patent

UNITED STATES PATENTS

| Number | Name | Date |
|---|---|---|
| 952,352 | Pieper | Mar. 15, 1910 |
| 1,033,076 | Allen | July 23, 1912 |
| 1,042,200 | Caughrean | Oct. 22, 1912 |
| 1,709,189 | Radke | Apr. 16, 1929 |
| 1,715,968 | Weber et al. | June 4, 1929 |
| 1,755,721 | Winkler et al. | Apr. 22, 1930 |
| 1,787,739 | Wild | Jan. 6, 1931 |
| 1,886,295 | Morris | Nov. 1, 1932 |
| 2,065,205 | Appleyard et al. | Dec. 22, 1936 |
| 2,069,926 | Read | Feb. 9, 1937 |
| 2,107,170 | Wild | Feb. 1, 1938 |
| 2,219,827 | Kimball et al. | Oct. 29, 1940 |
| 2,280,854 | Rooney | Apr. 28, 1942 |
| 2,393,334 | Mobley et al. | Jan. 22, 1946 |
| 2,451,104 | Lowe | Oct. 12, 1948 |
| 2,619,869 | Stewart | Dec. 2, 1952 |
| 2,653,743 | Stenger | Sept. 29, 1953 |